United States Patent [19]

Lu

[11] Patent Number: 5,673,596
[45] Date of Patent: Oct. 7, 1997

[54] CORE ADJUSTER WITH LOCK MEMBER

[75] Inventor: Jian Gang Lu, Troy, Mich.

[73] Assignee: General Motors Corporation, Detroit, Mich.

[21] Appl. No.: 594,535

[22] Filed: Jan. 31, 1996

[51] Int. Cl.[6] .................................................. F16C 1/14
[52] U.S. Cl. ................................ 74/502.6; 74/502.4
[58] Field of Search ................... 74/502.4, 502.6, 74/501.5 R

[56] References Cited

U.S. PATENT DOCUMENTS

| | | | |
|---|---|---|---|
| 5,394,770 | 3/1995 | Boike et al. | 74/502.6 X |
| 5,477,745 | 12/1995 | Boike et al. | 74/502.6 |
| 5,570,612 | 11/1996 | Reasoner | 74/502.6 |
| 5,571,237 | 11/1996 | Lu et al. | 74/502.6 X |
| 5,588,334 | 12/1996 | Lu et al. | 74/502.6 |

*Primary Examiner*—Charles A. Marmor
*Assistant Examiner*—Mary Ann Battista
*Attorney, Agent, or Firm*—Donald F. Scherer

[57] ABSTRACT

Flexible cables require an adjustable end fitting to permit the exact length to be attained at installation in the system in which is to be controlled. The adjusting structure includes a body adjusting portion on the one end of the cable and an adjustable body core which will be attached to one of the working members. Each of the body core and the body adjusting portion have a toothed portion formed thereon which are alignable when the body adjusting portion is inserted within the adjustable body core. A lock member secures these two portions together with a toothed portion which engages the aligned toothed portions on the body members. In order to prevent premature locking of the two elements together, the retaining member is secured out of engagement with the toothed elements and also after engagement of the toothed elements the lock member is secured in the lock position. The positioning of the lock member is controlled by a single retainer clip which is slidably disposed on the adjustable body core.

4 Claims, 7 Drawing Sheets

CORE ADJUSTER WITH LOCK MEMBER

TECHNICAL FIELD

This invention relates to locking mechanisms for cable adjusters.

BACKGROUND OF THE INVENTION

Control cable assemblies or mechanisms are used with mechanical devices to permit remote manipulation by an operator. The cable assembly is generally designed to have excess length to allow for build and manufacturing tolerances in the mechanical devices as well as to accommodate attachment of the cable end to the mechanism to be operated. One such mechanical system is the manual shift control mechanism in an automatic transmission. The cable is connected between a manual control lever or operator control lever which is disposed on the vehicle steering column or floor console and to the transmission selector mechanism which is generally a pivotal lever mounted on the transmission casing.

In these systems, the cable is connected between the manual control lever and the transmission at assembly of the vehicle. Since build tolerances might interfere with a fixed length cable, an adjustable end is provided at the transmission selector mechanism. This will permit the installer to adjust the cable length and provide proper transmission operation alignment between the transmission indicator at the manual control lever and the transmission valving system which is operated by the transmission selector mechanism. This adjustment is accomplished by having a movable end at the transmission housing connection so that the two devices, the manual control lever and the transmission pivotal lever, can both be placed in a drive condition, such as park, or manual low, and the cable length can be adjusted and locked into position.

After the locking has occurred, there is generally no further need to reposition or readjust the cable length. It is desirable to ensure the maintenance of the fixed cable length so that proper feedback to the operator is given during operation.

SUMMARY OF THE INVENTION

It is an object of this invention to provide a retainer for maintaining a lock member in an unlocked position and in a locked position with an intermediate position permitting manipulation of the lock member to ensure the cable length adjustment after the cable has been installed.

In one aspect of the invention the cover member to secure the lock member in the desired position includes a slot portion which engages tabs on the lock member to ensure the lock member is maintained in the unlocked position. The retainer member is slidable on the cable assembly to an intermediate position which permits the lock member to be depressed within the cable assembly to ensure the desired operating length. The retainer member is slidable to a third position in which a wall thereon overlaps a portion of the lock member to ensure the lock member remains in the locked position.

DESCRIPTION OF AN EXEMPLARY EMBODIMENT

Figure 1:
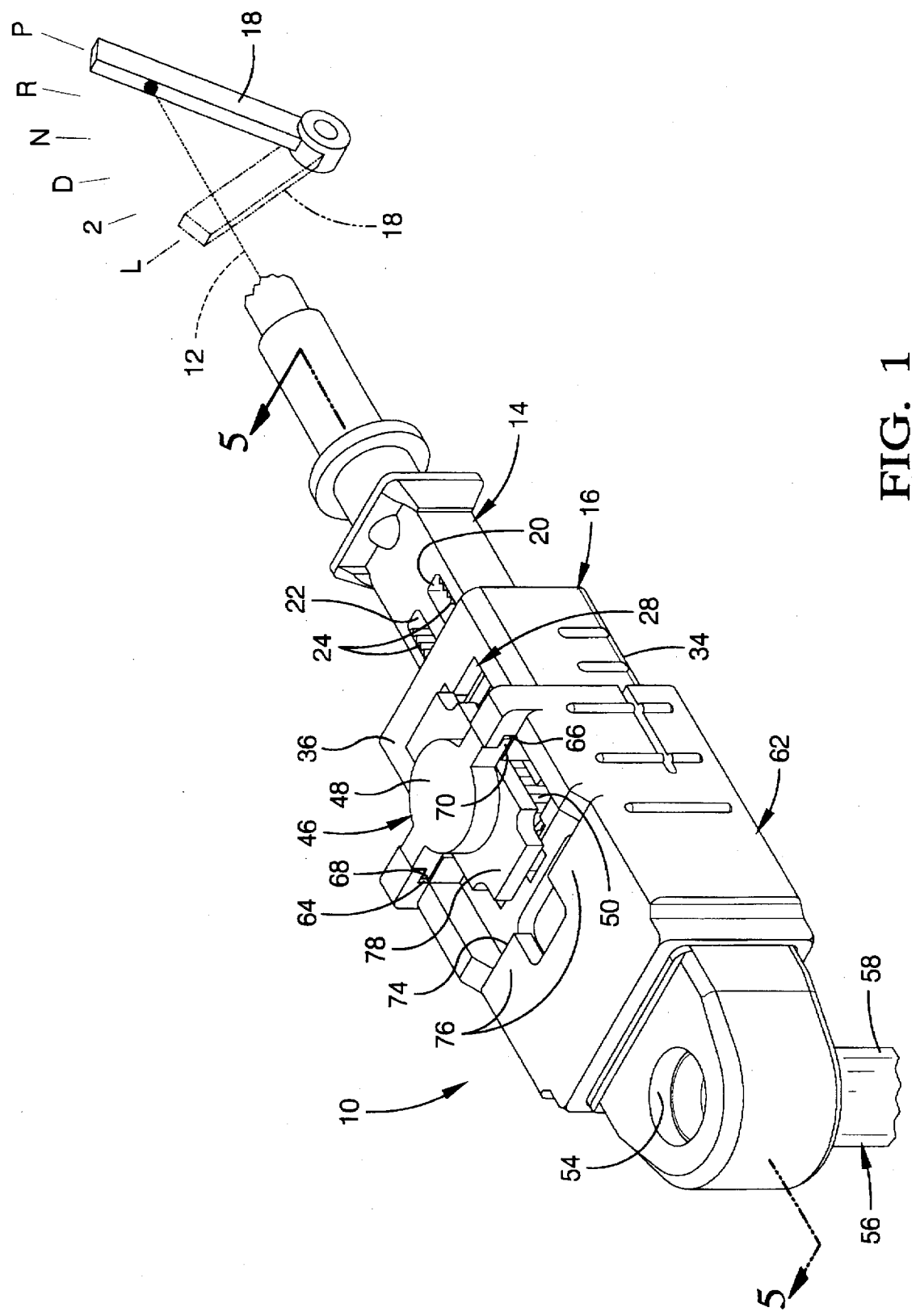
FIG. 1 is a perspective view of a cable assembly incorporating the present invention with the lock member retained in the unlocked position.

A cable assembly 10 includes a flexible cable member 12 having an adjustable portion or body 14 and an adjustable body core 16. The cable 12 is operatively connected in a well known manner to an operator control or manual lever 18 for an automatic transmission, not shown. As is well known, the lever 18 is movable by the operator to a plurality of transmission operating or drive conditions including a Park condition "P", a Reverse condition "R", a Neutral condition "N", a Drive condition "D", an Intermediate condition "2", and a Low forward drive condition "L". The Park position "P" and "L" position represent the extreme travels of the control system manual lever 18.

Figure 4:
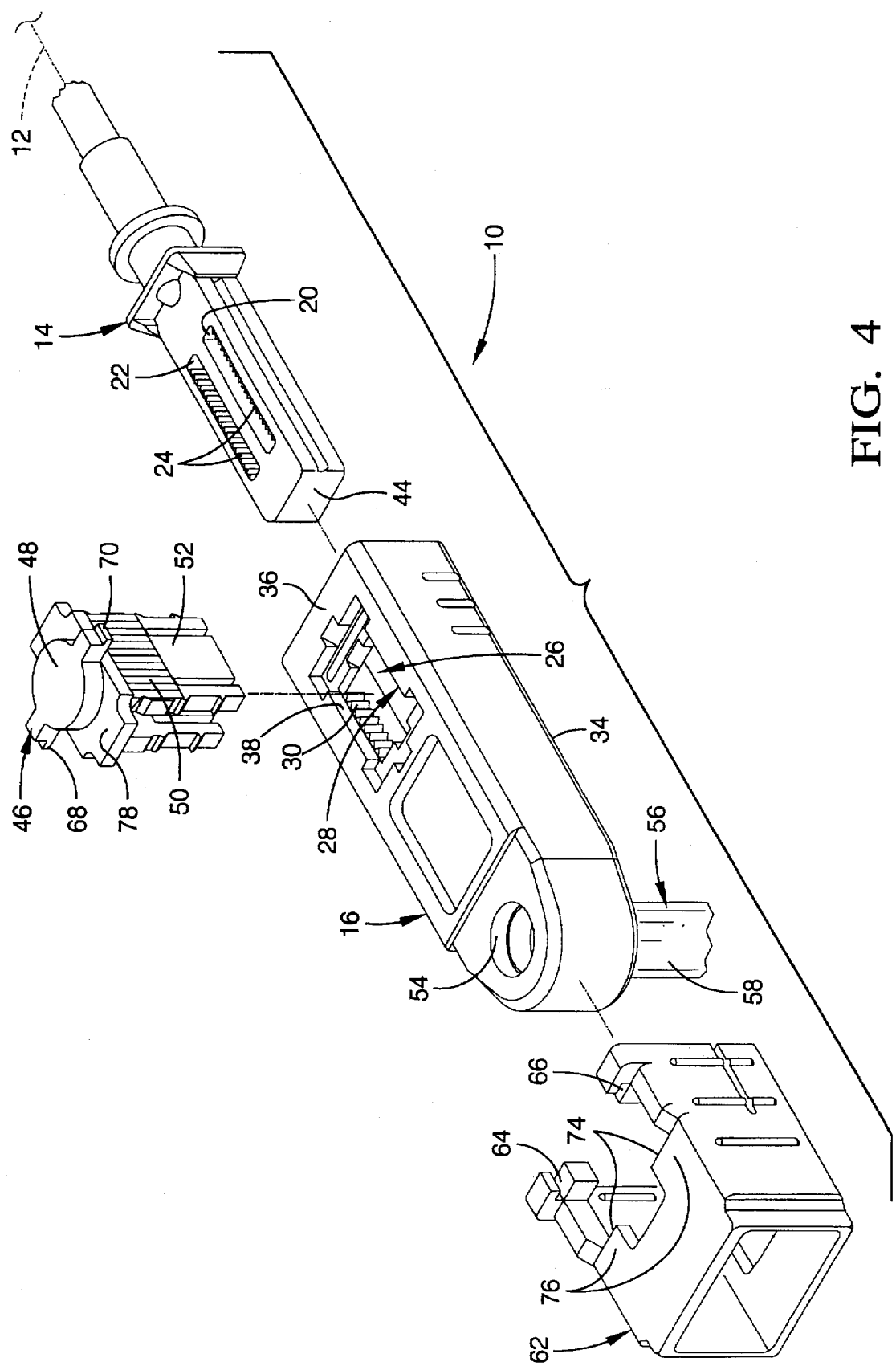
FIG. 4 is an exploded view of the components of the cable adjusting portion and the retaining clip.

The adjustable portion or body 14 has a pair of channels 20 and 22, each of which has two side toothed surfaces 24 which extend essentially the length of the opening. The body core 16 has a central opening or recess 26 in which the adjustable portion 14 is at least partially slidably disposed. The body core 16 has a transverse opening 28 having an upper portion 30 which is toothed in a manner similar to the surfaces 24 (FIG. 4), and a lower opening 32 which is untoothed and extends outwardly through the bottom surface 34 of the body core 16. The body core 16 has an upper surface 36 in which a recess 38 is formed which is in contiguous relation with the toothed portion 30.

The recess 26 has disposed therein one or more helical springs 40 which are placed in abutment between a wall 42 of the recess 26 and a wall 44 which forms one end of the adjustable portion 14. The wall 44 closes the channels 20, 22 of the adjustable portion 14.

Figure 5:
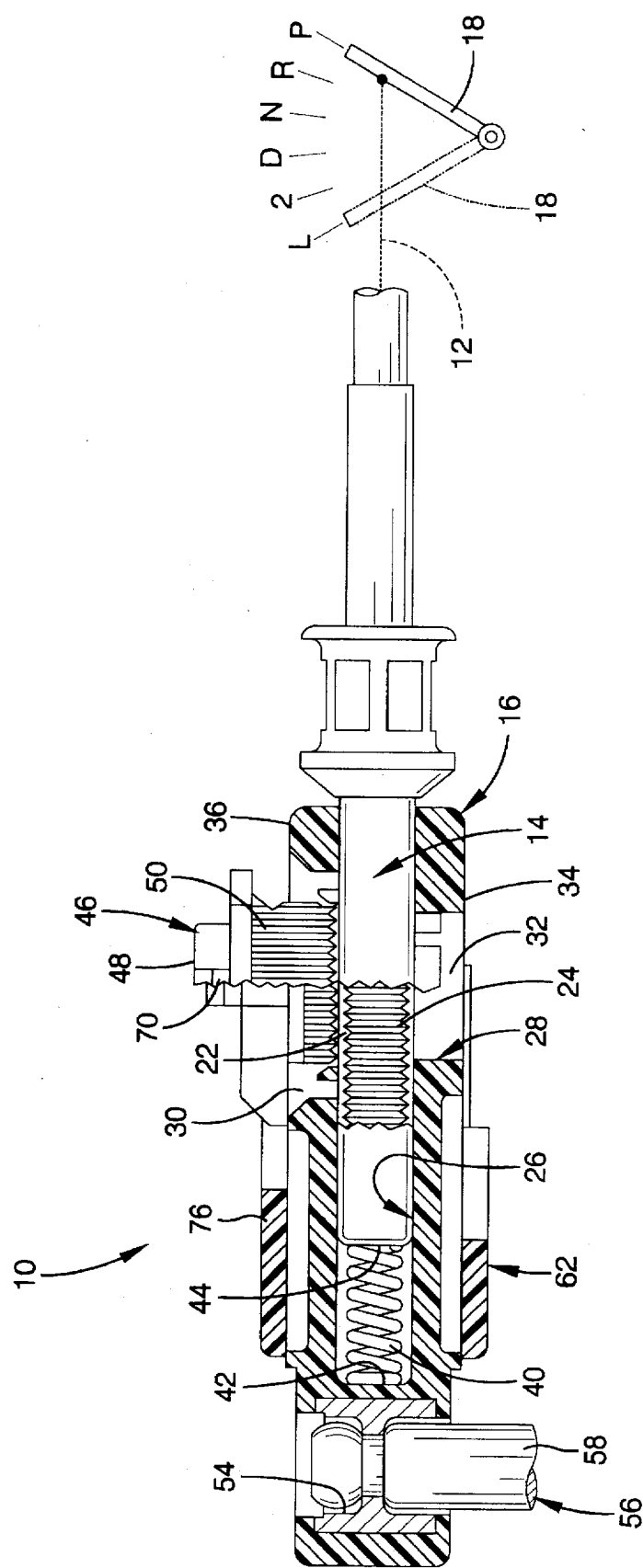
FIG. 5 is a view taken along line 5—5 of FIG. 1.

The spring 40 urges the adjustable portion 14 outward from the opening 26. To prevent the adjustable portion 14 from being removed or pushed out of the opening 26, a lock member 46 is positioned in the opening 28. The lock member 46 has a top 48 and bifurcated toothed surface sections 50 depending therefrom and lower rectangular portions 52 depending from each of the toothed sections 50. The lower rectangular portions 52 have plain or smooth sidewalls which, in the position shown in FIGS. 1 and 5, are disposed in the channels 20 and 22 adjacent the side surfaces 24. Since each portion 52 has plain surfaces, the adjustable portion 14 is not retained in the opening 26 and is therefore movable relative to the body core 16. The spring 40 pushes or urges the adjustable portion 14 against the rectangular portions 52 to prevent removal of the adjustable portion 14 from the body core 16.

The body core 16 has a socket opening 54 in which a conventional ball and socket assembly 56 is disposed. The ball and socket assembly 56 includes a shaft 58 which is adapted to connect with a conventional transmission input control lever, not shown, disposed on a conventional automatic transmission, not shown.

As is well known, the transmission input controls, such as that attached to shaft 58, are pivotally disposed to operate a conventional detent plate or rooster comb disposed within the transmission. The detent plate, in turn, moves a selector control valve which is operable to hydraulically condition the transmission from various operating conditions.

As shown in FIGS. 1 and 5, the cable 12 is free to move relative to the body core 16, such that the lever 18 can be disposed in one position and the lever attached to shaft 58 can be disposed in a different control position. To ensure that the transmission cable assembly disposed between the operator lever 18 and the transmission is of the proper length, the lever 18 and the lever attached to the shaft 58 are disposed in the same operating condition such as Low "L", which will establish a desired length between the operator lever 18 and the transmission control. In this position, the body core 16 is locked to the adjustable portion 14, such that when the lever 18 is moved from the Low position to the Park position, the transmission control lever, not shown, will also be moved to the same positions and any intermediate position desired by the operator.

Figure 2:
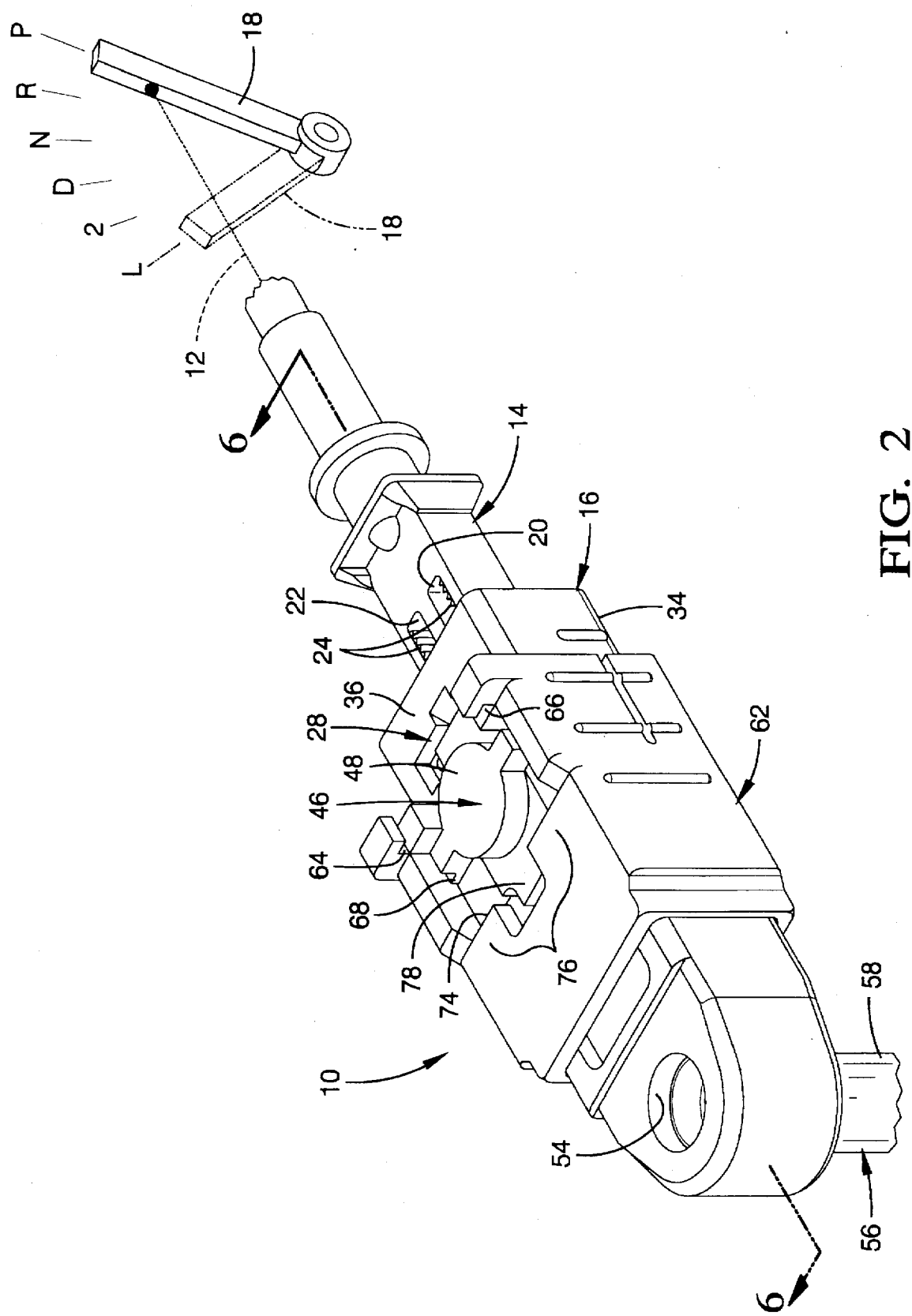
FIG. 2 is a view similar to FIG. 1 wherein the lock member has been depressed to the locked position.

The unadjusted cable length, as shown in FIGS. 1 and 2, is assembled between the operator control lever 18 and the transmission. While this is occurring, it is desirable to maintain the adjustable portion 14 movable relative to the body core 16 until the proper alignment of the levers 18 and shaft 58 is attained. To ensure that the lock 46 remains in the unlatched or unlocked condition, a retainer clip 62 is slidably positioned on the body core 16 in a manner to prevent the lock 46 from being depressed into the opening 28.

The retainer clip 62 has a pair of spaced slots 64 and 66 which are alignable with tabs 68 and 70 formed on the top surface 48 of the lock member 46. When the tabs 68 and 70 are positioned within their respective slot 64 and 66, the lock member 46 cannot be depressed and the adjustable portion 14 is freely movable relative to the body core 16 to the extent permitted by the portions 52. This is the position of the cable assembly as shown in FIGS. 1 and 5.

When the cable length is to be adjusted, the retainer clip 62 is slid along the adjustable body core 16 such that the tabs 68 and 70 are released by the slots 64 and 66 and the lock member 46 is aligned within an opening 74 formed in the retainer clip 62. This is the condition shown in FIGS. 2 and 6. When this position has been attained, the cable length can be adjusted as described above and the lock member 46 can be depressed in the transverse opening 28 such that the toothed surfaces 50 engage the toothed surfaces 30 on the body core 16 and the adjustable portion 14 thereby securing the two members together to prevent any change in the length of the cable assembly 10.

Figure 3:
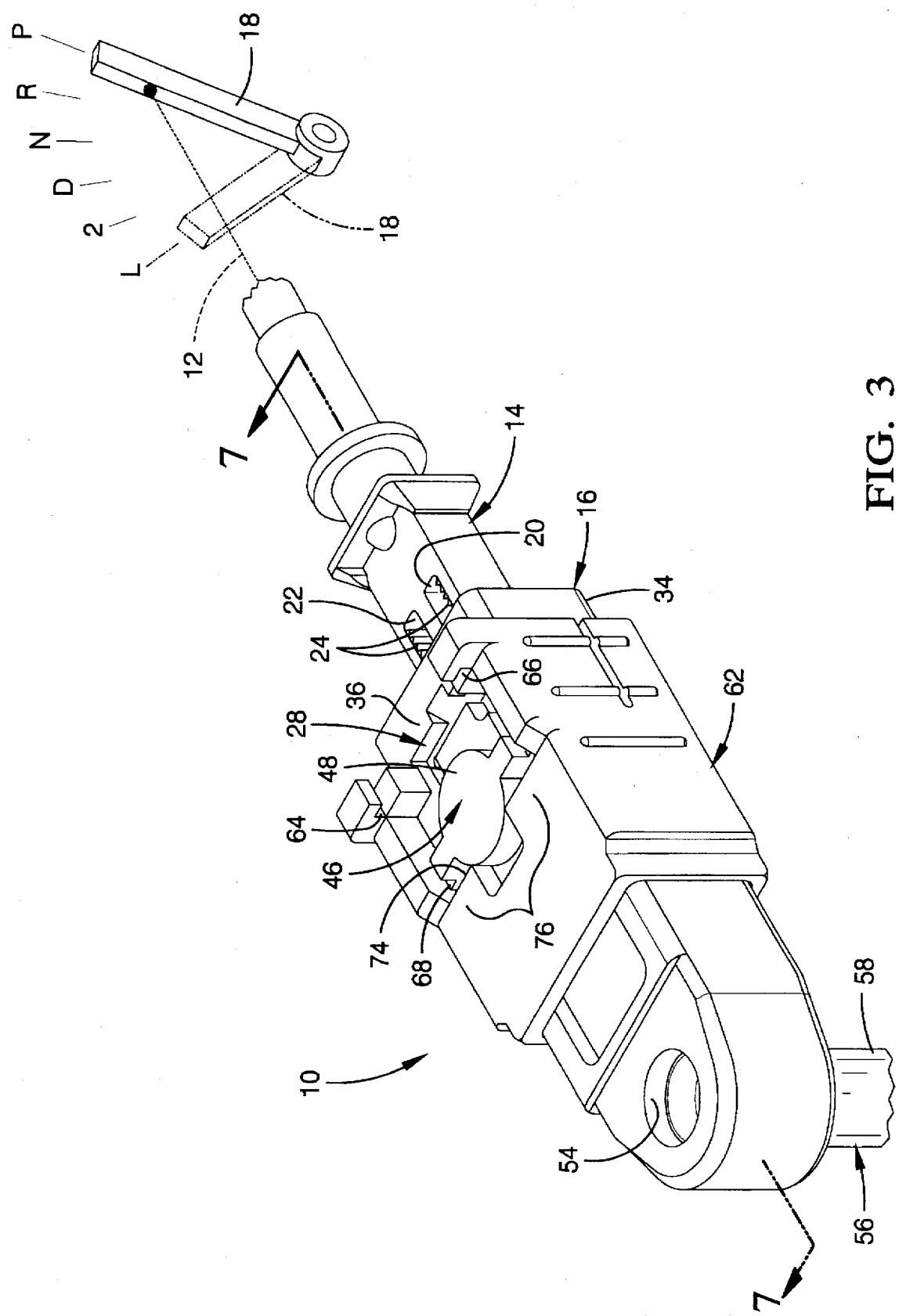
FIG. 3 is a view similar to FIG. 1 wherein a retainer on the assembly has been adjusted or positioned to ensure retention of the lock member.
Figure 6:
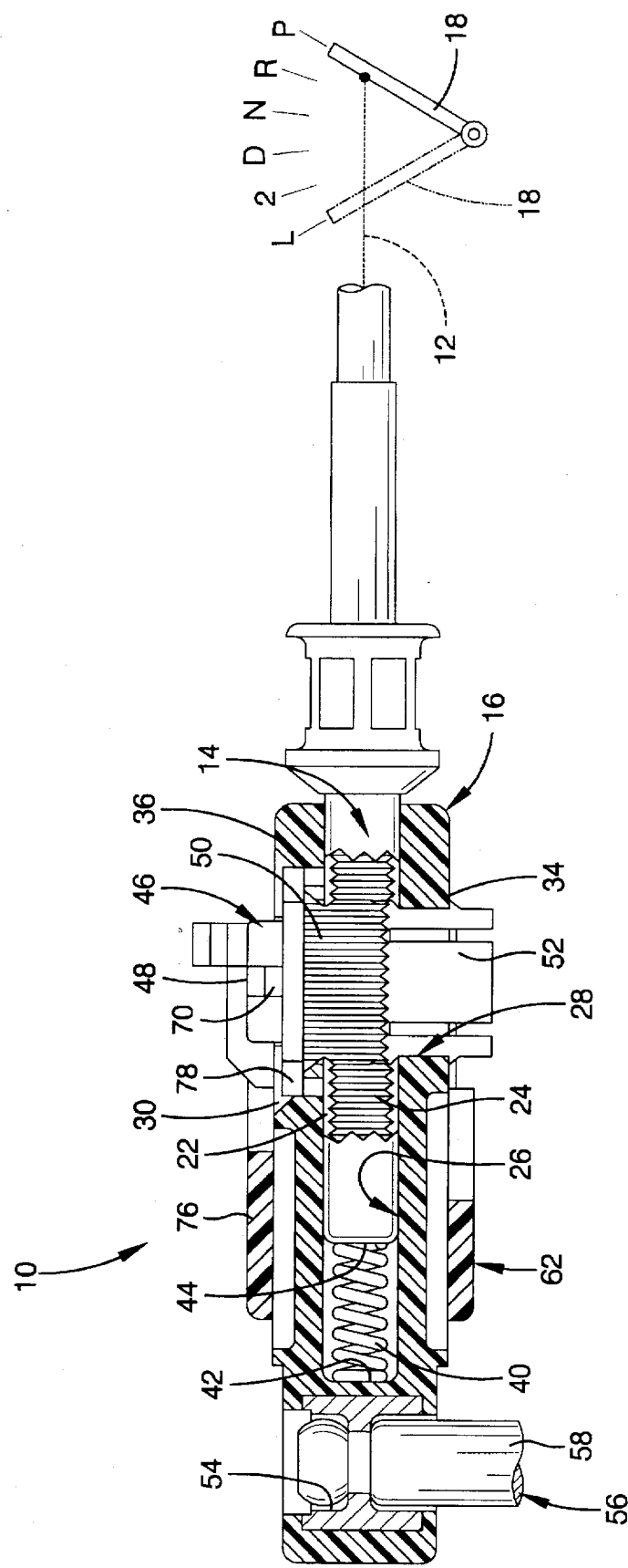
FIG. 6 is a view taken along line 6—6 of FIG. 2.
Figure 7:
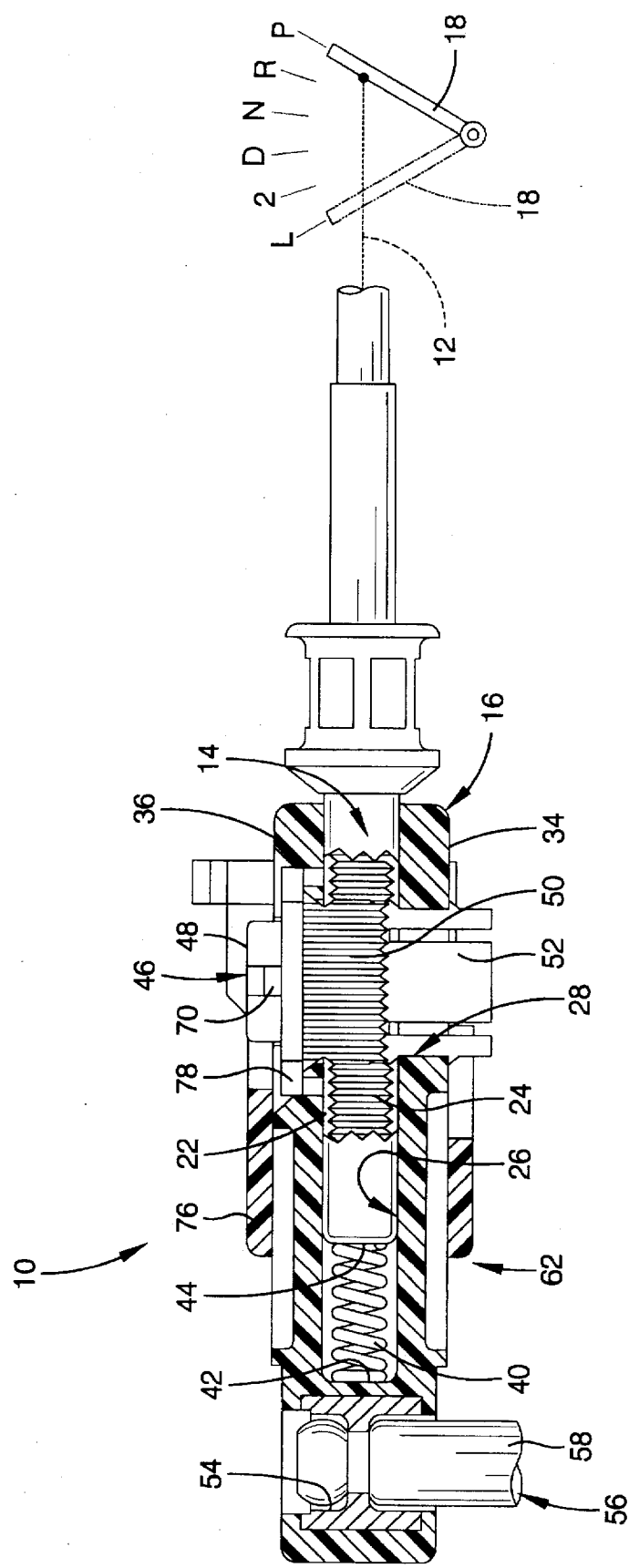
FIG. 7 is a view taken along line 7—7 of FIG. 3.

At the assembly of the transmission to the cable assembly 10, the lock position shown in FIGS. 2 and 6 will be attained by the assembler. Following this maneuver, the clip 62 can be slid further along the body core 16 toward the adjustable portion 14 such that a wall 76 will overlap a shelf 78. The wall 76 is formed on the retainer clip 62 while the shelf 78 is formed on the top surface 48 of the lock member 46. Once this position has been attained, as shown in FIGS. 3 and 7, the lock member 46 cannot be inadvertently disengaged from the toothed portions of the body core 16 and adjustable portion 14. Thus, the cable length will be retained in the desired condition.

If, for some reason, the cable length is found to be incorrect, the retainer clip 62 can be manipulated along the body core 16 to a position which will permit the lock member 46 to be unlatched from the toothed portions of body core 16 and adjustable portion 14 to permit free adjustment of the length. Following this readjustment, the retainer clip 62 would again be manipulated along the body core 16 to ensure the lock member is retained in the proper location.

The present invention has the advantage over prior art devices which have a single clip member to retain the lock in the unlocked portion and a separate retaining clip to secure the lock member in the locked position. The prior art has at least one element which is necessarily removed from the assembly and must either be recycled or returned to the cable assembly.

The present invention also eliminates the possibility that one of the two retaining devices will be forgotten or misplaced during cable assembly.

I claim:

1. A cable length adjustment and lock assembly comprising:

a cable body portion having a recessed lock portion;

a cable operating portion having a toothed adjustment portion operatively disposed in said recessed lock portion for selective sliding motion relative thereto;

a lock member operatively connected with said recessed lock portion and being selectively movable to engage said recessed lock portion and said adjustment portion to prevent relative motion therebetween and to establish a cable length; and a unitary retaining clip slidably disposed on one of said body portion and said cable operating portion including a first latching means integrally formed therewith for selectively preventing operating of said lock member, a second latching means integrally formed therewith and being spaced from and movable with said first latching means for selectively preventing removal of said lock member from engagement with said recessed lock portion and said adjustment portion, and an opening portion formed therein between the first and second latching means for permitting selective engagement and disengagement of said lock member with said cable body portion and said cable operating portion.

2. The cable length adjustment and lock assembly as defined in claim 1, wherein said lock member has a pair of spaced tab portions and said unitary retaining clip has a pair of spaced slot portions selectively engageable with said tab portions for retaining said lock member in an unlocked condition.

3. The cable length adjustment and lock assembly defined in claim 1 wherein said lock member has a longitudinally extending shelf portion and said second latching means of said unitary retaining clip including a wall portion which is movable with said retaining clip to overlap said shelf portion when said lock member is engaged in a locking condition between said cable body portion and said cable operating portion.

4. A cable length adjustment and lock assembly comprising:

a cable body portion having a recessed lock portion;

a cable operating portion having a toothed adjustment portion operatively disposed in said recessed lock portion for selective sliding motion relative thereto;

a lock member operatively connected with said recessed lock portion and being selectively movable to engage said recessed lock portion and said adjustment portion to prevent relative motion therebetween and to establish a cable length, said lock member including a pair of spaced tab portions; and a retaining clip means slidably disposed on one of said body portion and said cable operating portion having a first latching means for selectively preventing operating of said lock member, a second latching means for selectively preventing removal of said lock member from engagement with said recessed lock portion and said adjustment portion, an opening portion for permitting selective engagement and disengagement of said lock member with said cable body portion and said cable operating portion, and a pair of spaced slot portions selectively engageable with said tab portions of said lock member for retaining said lock member in an unlocked condition.

* * * * *